United States Patent
Zhang et al.

(10) Patent No.: US 8,585,067 B2
(45) Date of Patent: Nov. 19, 2013

(54) TORSION BEAM OF TWIST AXLE

(75) Inventors: Ying Zhang, Troy, MI (US); James R. Byrne, II, Shelby Township, MI (US); Alexander Zak, Moedling (AT); Seetarama S. Kotagiri, Rochester Hills, MI (US); Nikhil Madan Yardi, Rochester Hills, MI (US)

(73) Assignee: Magna International Inc., Aurora, Ontario (CA)

( * ) Notice: Subject to any disclaimer, the term of this patent is extended or adjusted under 35 U.S.C. 154(b) by 0 days.

(21) Appl. No.: 13/504,945

(22) PCT Filed: Nov. 1, 2010

(86) PCT No.: PCT/CA2010/001747
§ 371 (c)(1),
(2), (4) Date: Apr. 28, 2012

(87) PCT Pub. No.: WO2011/050483
PCT Pub. Date: May 5, 2011

(65) Prior Publication Data
US 2012/0211961 A1     Aug. 23, 2012

Related U.S. Application Data

(60) Provisional application No. 61/256,424, filed on Oct. 30, 2009.

(51) Int. Cl.
*B60G 9/02* (2006.01)

(52) U.S. Cl.
USPC ...... 280/124.116; 280/124.166; 280/124.106; 280/124.128

(58) Field of Classification Search
USPC ............... 280/124.166, 124.116, 124.106, 280/124.128
See application file for complete search history.

(56) References Cited

U.S. PATENT DOCUMENTS

| | | | | |
|---|---|---|---|---|
| 5,409,255 A * | 4/1995 | Alatalo et al. | ......... | 280/124.166 |
| 5,518,265 A * | 5/1996 | Buthala et al. | ......... | 280/124.166 |
| 5,520,407 A * | 5/1996 | Alatalo et al. | ......... | 280/124.166 |
| 6,758,921 B1 * | 7/2004 | Streubel et al. | ............. | 148/593 |
| 6,889,989 B2 * | 5/2005 | Park | ..................... | 280/124.166 |
| 7,284,765 B1 * | 10/2007 | Inoue et al. | ............ | 280/124.166 |
| 7,478,820 B2 * | 1/2009 | Murata | .................. | 280/124.106 |
| 7,556,272 B2 | 7/2009 | Marchel | | |
| 7,971,888 B2 * | 7/2011 | Kim | ...................... | 280/124.116 |
| 8,113,527 B2 * | 2/2012 | Borgna et al. | .......... | 280/124.166 |
| 2001/0022099 A1 * | 9/2001 | Ueno et al. | ...................... | 72/57 |

(Continued)

FOREIGN PATENT DOCUMENTS

| DE | 2740948 A1 | 3/1979 |
|---|---|---|
| DE | 10054692 A1 | 5/2002 |
| EP | 1454776 A2 | 9/2004 |

*Primary Examiner* — Nicole Verley
(74) *Attorney, Agent, or Firm* — Dickinson Wright PLLC

(57) ABSTRACT

In one aspect, the invention is directed to a twist beam axle for a vehicle. The twist beam axle includes a twist beam and a reinforcement member. The twist beam has a longitudinal axis and has a generally concave cross-sectional shape. The reinforcement member extends longitudinally and is connected to the twist beam to form a longitudinally extending tubular form therewith. The twist beam has first and second side walls. At least one of the side walls extends outside of the tubular form. The tubular form has cross-sectional dimensions that are selected based on the vehicle on which the twist beam axle is to be used.

6 Claims, 5 Drawing Sheets

(56) References Cited

U.S. PATENT DOCUMENTS

| | | | |
|---|---|---|---|
| 2003/0044632 A1* | 3/2003 | Schonleber et al. | 428/595 |
| 2004/0256828 A1* | 12/2004 | Han et al. | 280/124.106 |
| 2007/0052194 A1* | 3/2007 | Marchel | 280/124.166 |
| 2007/0069496 A1* | 3/2007 | Rinehart et al. | 280/124.166 |
| 2008/0191443 A1* | 8/2008 | Gabbianelli et al. | 280/124.166 |
| 2009/0014975 A1* | 1/2009 | Lee | 280/124.116 |

* cited by examiner

TORSION BEAM OF TWIST AXLE

CROSS REFERENCE TO RELATED APPLICATIONS

This application claims priority to International Patent Application Serial No. PCT/CA10/001747 filed on Nov. 1, 2010, entitled "Torsion Beam Of Twist Axle" and U.S. Provisional Patent Application No. 61/256,424 filed on Oct. 30, 2009, entitled "Tuned Torsion Beam Of Twist Axle," the entire disclosures of all of these applications being considered part of the disclosure of this application and are hereby incorporated by reference.

FIELD OF THE INVENTION

The present invention relates to torsional suspensions for vehicles and more particularly to twist beam axles for torsional suspensions.

BACKGROUND OF THE INVENTION

Twist beam axles are used on some vehicles, typically as a means of packaging a suspension while minimizing intrusion into the passenger compartment. A typical application of a twist beam axle is on the rear wheels of a vehicle. The twist beam axle typically includes a U-shaped or V-shaped bar that extends between the control arm for the driver's side rear wheel to the control arm for the passenger's side rear wheel. A typical twist beam axle is shown at 100 in FIG. 1. The twist beam axle 100 is shown connected between two control arms 101a and 101b. The twist beam axle 100 includes a twist beam 102 that is V-shaped in cross-section and a stabilizer bar 104 in the interior of the V of the twist beam 102. The stabilizer bar 104 may be welded to the interior of the V.

The properties of the stabilizer bar 104 are typically selected to provide the twist axle 100 with a selected torsional stiffness to 'tune' the twist axle 10 for use on a particular model of vehicle. In some cases, the stabilizer bar is made from solid bar material. In other cases, the stabilizer bar 104 is made from hollow tubing. In either case, the resultant twist axle is relatively heavy, and is relatively expensive to manufacture.

SUMMARY OF THE INVENTION

In one aspect, the invention is directed to a twist beam axle for a vehicle. The twist beam axle includes a twist beam and a reinforcement member. The twist beam has a longitudinal axis and has a generally concave cross-sectional shape. The reinforcement member extends longitudinally and is connected to the twist beam to form a longitudinally extending tubular form therewith. The twist beam has first and second side walls. At least one of the side walls extends outside of the tubular form. The tubular form has cross-sectional dimensions that are selected in dependence upon predetermined stiffness and durability requirements of the vehicle on which the twist beam axle is to be used. In another aspect, the invention is directed to a torsional suspension assembly including the twist beam axle described above.

BRIEF DESCRIPTION OF THE DRAWINGS

The present invention will now be described by way of example only with reference to the attached drawings, in which:

FIG. 2b is another perspective view of torsional suspension assembly shown in FIG. 2a;

FIG. 2c is a sectional end view of a twist beam axle that is part of the torsional suspension assembly shown in FIG. 2a;

DETAILED DESCRIPTION OF THE INVENTION

Figure 1:
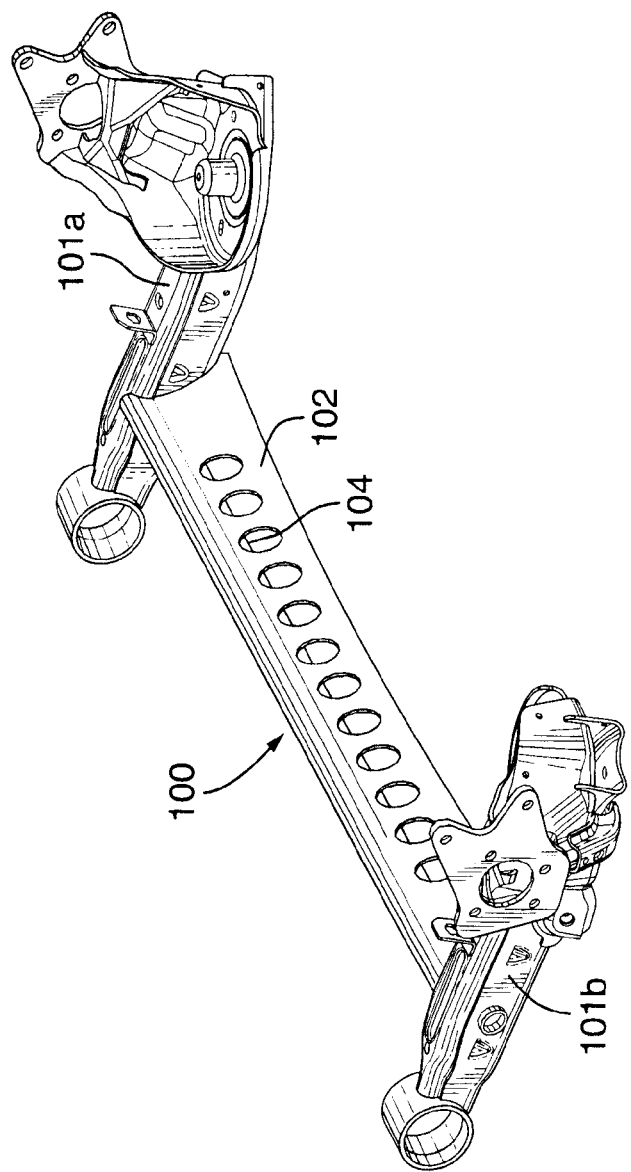
FIG. 1 is an perspective view of a torsional suspension assembly in accordance with the prior art.
Figure 2A:
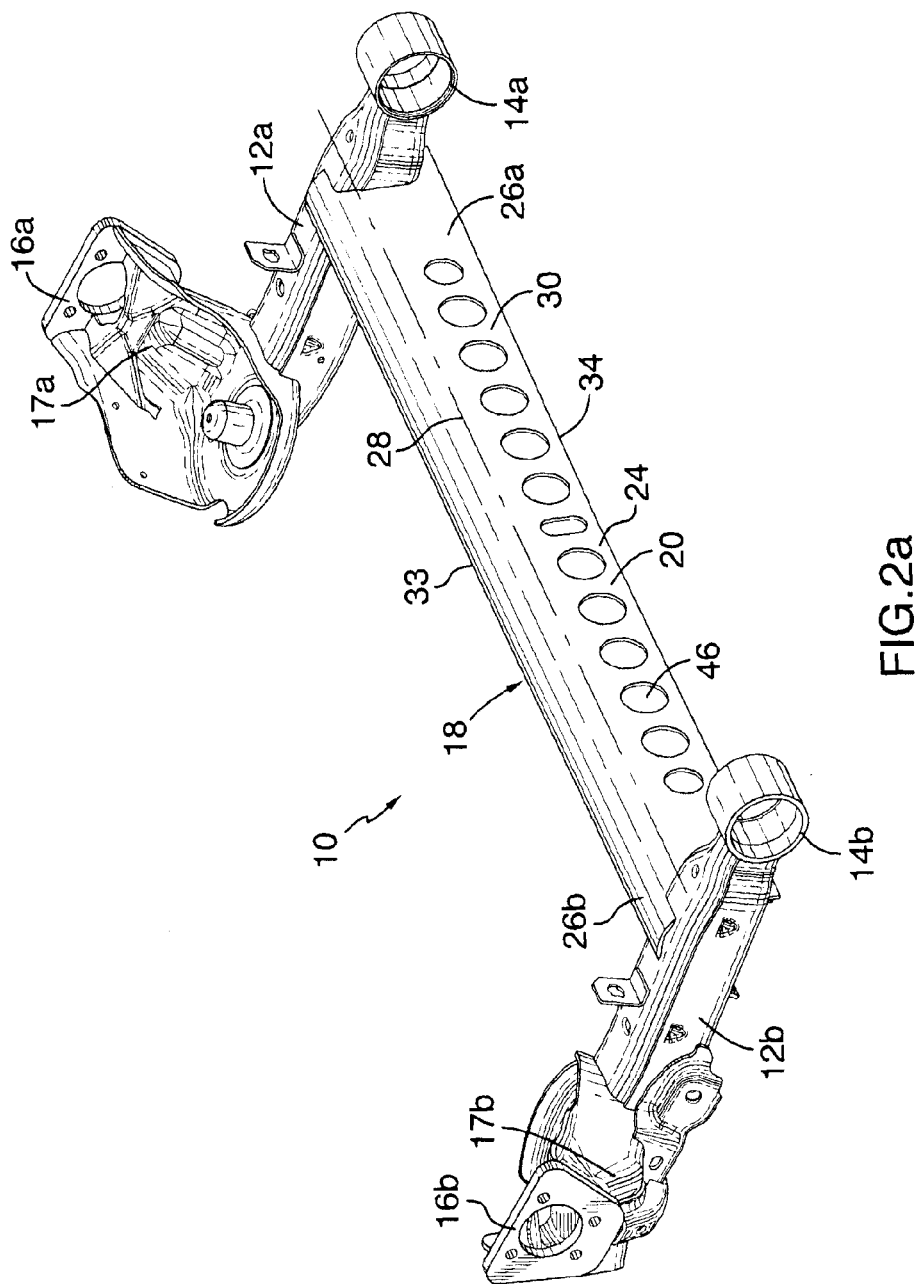
FIG. 2a is a perspective view a torsional suspension assembly in accordance with an embodiment of the present invention.
Figure 2B:
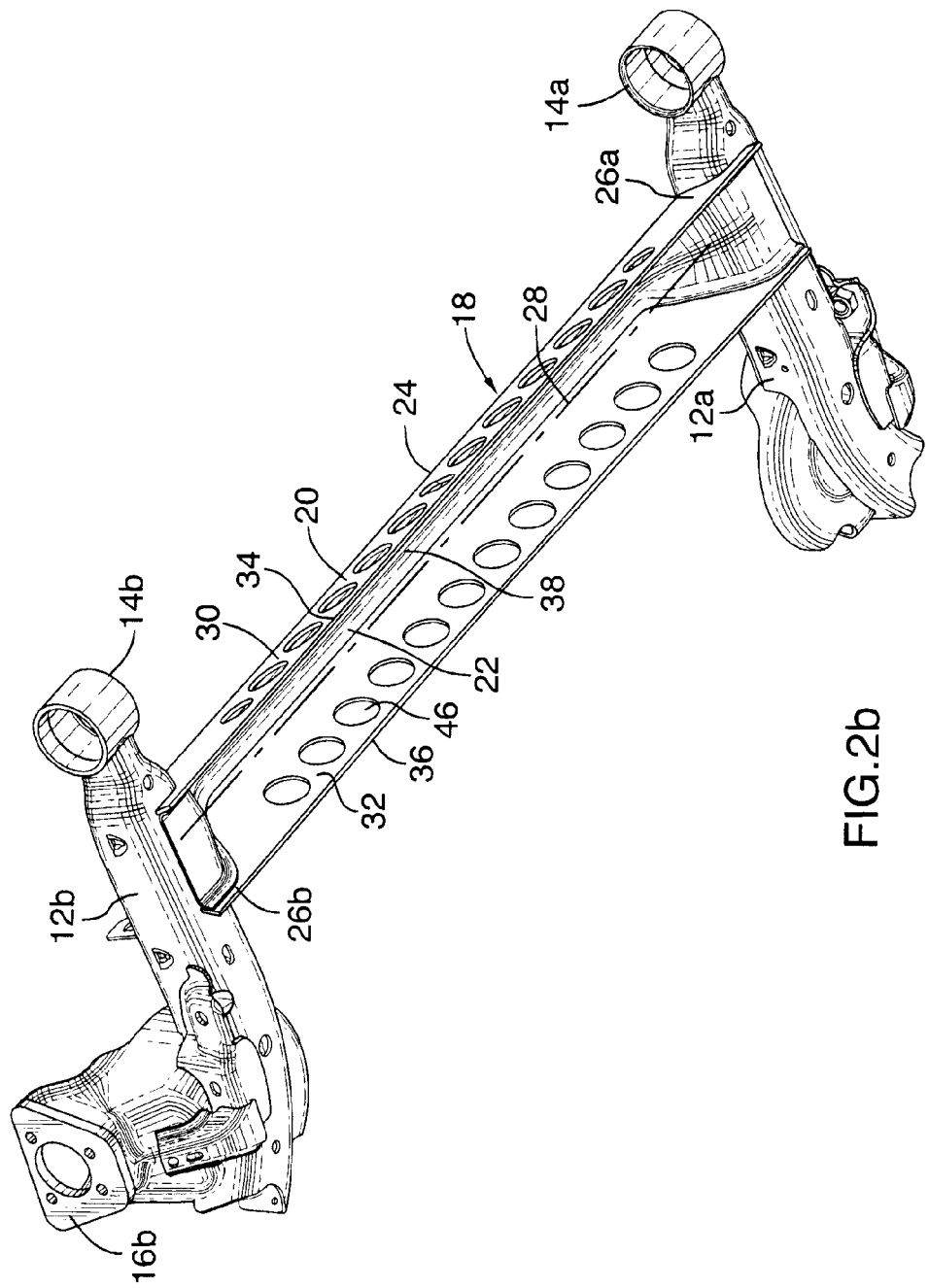

Reference is made to FIGS. 2a and 2b, which show a torsional suspension assembly 10 for a vehicle, in accordance with an embodiment of the present invention. The torsional suspension assembly 10 includes a first control arm 12a and a second control arm 12b, a first vehicle body mounting member 14a connected to the first control arm 12a, a second vehicle body mounting member 14b connected to the second control arm 12b, a first wheel mounting member 16a connected to the first control arm 12a and a second wheel mounting member 16b connected to the second control arm 12b, a first spring mounting member 17a and a second spring mounting member 17b, and a twist beam axle 18 extending between the first and second control arms 12a and 12b.

Figure 2C:
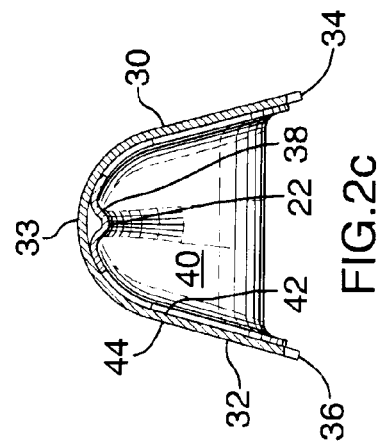
Figure 2D:
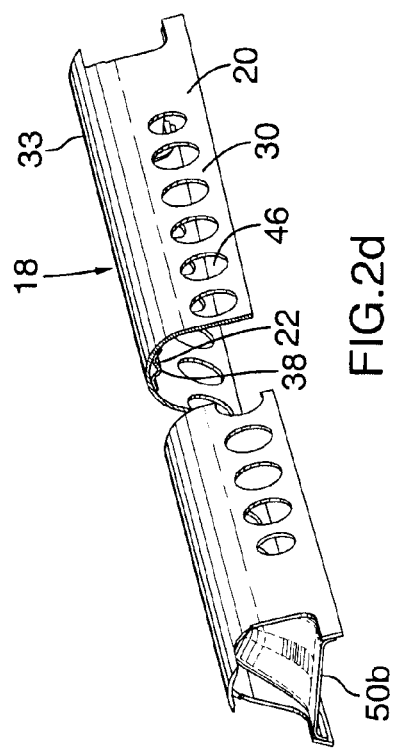
FIG. 2d is a perspective view of the twist beam axle shown in FIG. 2c.

The twist beam axle 18 has a central portion 24, a first end portion 26a, and a second end portion 26b, at which it connects to the first and second control arms 12a and 12b. With reference to FIGS. 2c and 2d, the twist beam axle 18 includes a twist beam 20 and a reinforcement member 22.

The twist beam 20 has a longitudinal axis shown at 28. The twist beam 20 includes a first side wall 30 and a second side wall 32, and in the embodiment shown in FIGS. 2a-2d, the twist beam 20 further includes a base portion 33, through which the first and second side walls 30 and 32 are connected to each other. The base portion 33 in the embodiment shown in FIG. 2c is generally arcuate and joins to the side walls 30 and 32 forming a continuous arcuate shape free of discontinuities.

The base portion 33 in the embodiment shown in FIG. 2c is at the top of the twist beam 20; however, in alternative embodiments that are not shown, the twist beam 20 could be oriented so that the base portion 33 is not at the top. For example, the twist beam 20 could be oriented so that the base portion 33 is at the bottom.

The twist beam 20 has a generally concave shape. In the embodiment shown in FIG. 2c, it has a downwardly concave shape; however, the twist beam 20 could be oriented so that the concavity faces in another direction. For example, it could alternatively have an upwardly concave shape.

It will be noted that, in the context of this description and the appended claims, having a generally concave shape does not necessarily mean that the twist beam 20 has an arcuate shape, although the twist beam 20 does have a generally arcuate shape in the embodiment shown in FIG. 2c. It could alternatively have a non-arcuate shape, however, such as an upside-down V-shape, which, in the context of the present description and the appended claims, would still constitute a concave shape.

The first and second side walls 30 and 32 provide the twist beam with a selected resistance to bending. The twist beam 20 has a first side edge 34 and a second side edge 36. The first and second side edges 34 and 36 may be configured in any suitable way. For example, they may be oriented downwards as shown in FIGS. 2c and 2d, or, for example, they may be curled upwards (not shown).

The reinforcement member 22 extends longitudinally and is connected to the twist beam 20 to form a longitudinally extending tubular form 38 therewith. The connection may be any suitable type of connection, such as a welded connection, a brazed connection, a connection by mechanical fasteners such as rivets, or any other suitable type of connection.

In the embodiment shown in FIG. 2c, the reinforcement member 22 is engaged with the base portion 33 and is generally centered with respect to the twist beam 20 in the cross-sectional view shown in FIG. 2c. As shown, the reinforcement member 22 is less wide than the twist beam 20. As a result of that, and as a result of its positioning on the twist beam 20, the side walls 30 and 32 of the twist beam 20 extend outside of the tubular form 38 and extend downwards so as to contribute to the bending resistance of the twist beam axle 18. This arrangement yields a mass savings over a similar twist beam axle that is formed from a twist beam that has a tubular form welded to it.

By controlling the cross-sectional dimensions of the tubular form 38 that is formed, the torsional resistance of the twist beam axle 18 may be controlled, so as to tune the twist beam axle 18 for use on different models of vehicle and their stiffness and durability requirements. As an example, by increasing the size of the tubular form 38 the torsional stiffness in general increases.

The cross-sectional dimensions of the tubular form 38 may be controlled entirely by varying the size and shape of the reinforcement member 22. Thus, the twist beam 20 itself may remain entirely the same for each model of vehicle.

The twist beam 20 defines an interior 40 (FIG. 2c) by virtue of its concave shape. The reinforcement member 22 is preferably positioned on an interior facing surface 42 of the twist beam 20. It is alternatively possible, however, for the reinforcement member 22 to be positioned elsewhere on the twist beam 20, such as on an exterior facing surface 44.

As shown in FIGS. 2a, 2b, and 2d, the side walls 30 and 32 may include a plurality of lightening holes shown at 46 outside of the tubular form 38 but spaced from the side edges 34 and 36. This reduces the weight of the twist beam axle 18, while having a relatively low impact on its bending resistance and torsional resistance.

Figure 2E:
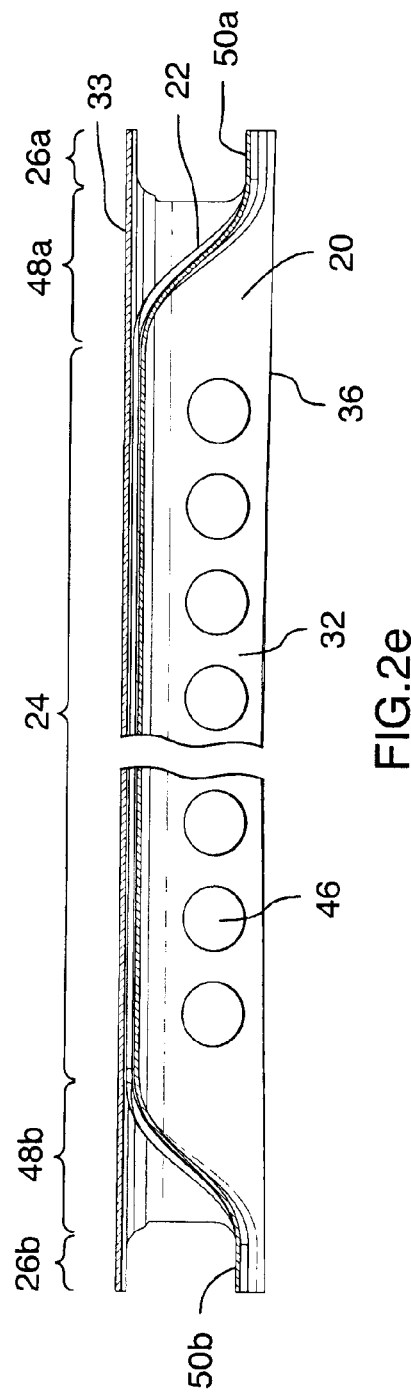
FIG. 2e is a sectional side view of the twist beam axle shown in FIG. 2c.

The cross-sectional view shown in FIG. 2c is in the central portion 24 of the twist beam axle 18. As shown in FIG. 2e, the twist beam axle 18 includes transition portions shown at 48a and 48b in which the reinforcement member 22 transitions outwards (downwards in the views shown in FIGS. 2c and 2d) to connect to the twist beam 20 proximate the side edges 34 and 36, so as to form a base surface (shown at 50a at one end and 50b at the other end) for receiving the control arm. The base surfaces 50a and 50b facilitate connecting the twist beam axle 18 to the first and second control arms 12a and 12b (FIGS. 2a and 2b).

Forming the base surfaces 50a and 50b at each end portion 26a and 26b directly from the reinforcement member 22 facilitates manufacture of the twist beam axle 18.

The positions and sizes of the transition portions 48a and 48b can be tailored as desired to tune the torsional stiffness of the twist beam axle 18. As a result of the above described configuration, the twist beam axle 18 is generally free of crush zones. Crush zones are shown in some twist beam axles of the prior art, and are zones where the reinforcement member 22 and the twist beam 20 are crushed together in order to control the torsional resistance of the twist beam axle. A problem with such twist beam axles is that they can be susceptible to fatigue in the crush zones as a result of the crushing operation itself.

Figure 3A:
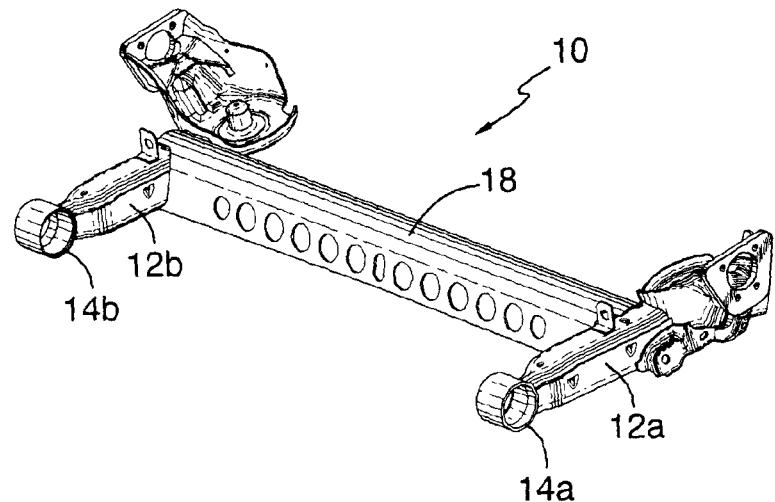
FIG. 3a is a perspective view of a variant of the torsional suspension assembly shown in FIG. 2a, wherein the twist beam axle is mounted rearwardly on the control arms.
Figure 3B:
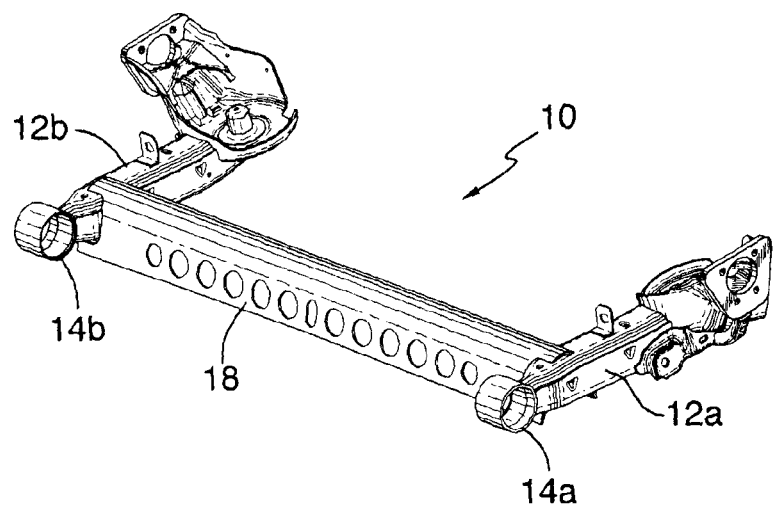
FIG. 3b is a perspective view of another variant of the torsional suspension assembly shown in FIG. 2a, wherein the twist beam axle is mounted forwardly on the control arms.

As shown in FIGS. 2a and 2b, the twist beam axle 18 may be centrally mounted on the control arms 12a and 12b. It is alternatively possible for the twist beam axle 18 to be rearwardly mounted as shown in FIG. 3a, wherein it is mounted to rearward portions of the control arms 12a and 12b. It is alternatively possible for the twist beam axle 18 to be forwardly mounted as shown in FIG. 3b, wherein it is mounted to forward portions of the control arms 12a and 12b.

The twist beam 20 and the reinforcement member 22 may be made from any suitable materials, such as from an automotive grade of steel, suitably treated for exposure to the elements during use.

While the above description constitutes a plurality of embodiments of the present invention, it will be appreciated that the present invention is susceptible to further modification and change without departing from the fair meaning of the accompanying claims.

What is claimed is:

1. A twist beam axle for a vehicle, comprising:
    a twist beam having a longitudinal axis, wherein the twist beam has first and second side walls and a generally concave cross-sectional shape; and
    a reinforcement member that extends longitudinally and is connected to the twist beam to form a longitudinally extending tubular form therewith,
    said reinforcement member having a central portion and a pair of end portions, and wherein each end portion has a generally flat control arm attachment surface for engagement with a control arm,
    wherein at least one of the side walls extends outside of the tubular form, and
    wherein the tubular form has cross-sectional dimensions that are selected in dependence upon a predetermined stiffness and durability of the vehicle on which the twist beam axle is to be used.

2. A twist beam axle as claimed in claim 1, wherein the twist beam defines an interior, and wherein the reinforcement member extends along the interior of the twist beam.

3. A twist beam axle as claimed in claim 2, wherein the first side wall has a first side edge, and the second side wall has a second side edge,
    wherein the twist beam has a central portion and two end portions,
    wherein in the central portion the reinforcement member is connected to the twist beam to define the tubular form therewith, and wherein in each of the end portions the reinforcement member connects to the twist beam proximate the first and second side edges of the first and second side walls in such a way as to define a second tubular form.

4. A torsional suspension assembly for a vehicle, comprising:
    a first control arm and a second control arm;
    a vehicle body mounting member connected to each control arm for mounting pivotally to a body of the vehicle;
    a wheel mounting member connected to each control arm for mounting to a vehicle wheel;

a spring mounting member for receiving an end of a suspension spring; and a twist beam axle including:

a twist beam having a longitudinal axis, wherein the twist beam has first and second side walls and a generally concave cross-sectional shape; and a reinforcement member that extends longitudinally and is connected to the twist beam to form a longitudinally extending tubular form therewith, said reinforcement member having a central portion and a pair of end portions, and wherein each end portion has a generally flat control arm attachment surface in engagement with one of the control arms, and wherein at least one of the side walls extends laterally outside of the tubular form, wherein the tubular form has cross-sectional dimensions that are selected in dependence upon a predetermined stiffness and durability of the vehicle on which the twist beam axle is to be used.

5. A torsional suspension assembly as claimed in claim 4, wherein the twist beam defines an interior, and wherein the reinforcement member extends along the interior of the twist beam.

6. A torsional suspension assembly as claimed in claim 5, wherein the first side wall has a first side edge, and the second side wall has a second side edge, wherein the twist beam has a central portion and two end portions, wherein in the central portion the reinforcement member is connected to the twist beam to define the tubular form therewith, and wherein in each of the end portions the reinforcement member connects to the twist beam proximate the first and second side edges of the first and second side walls in such a way as to define a second tubular form.

* * * * *